United States Patent Office 2,946,186
Patented July 26, 1960

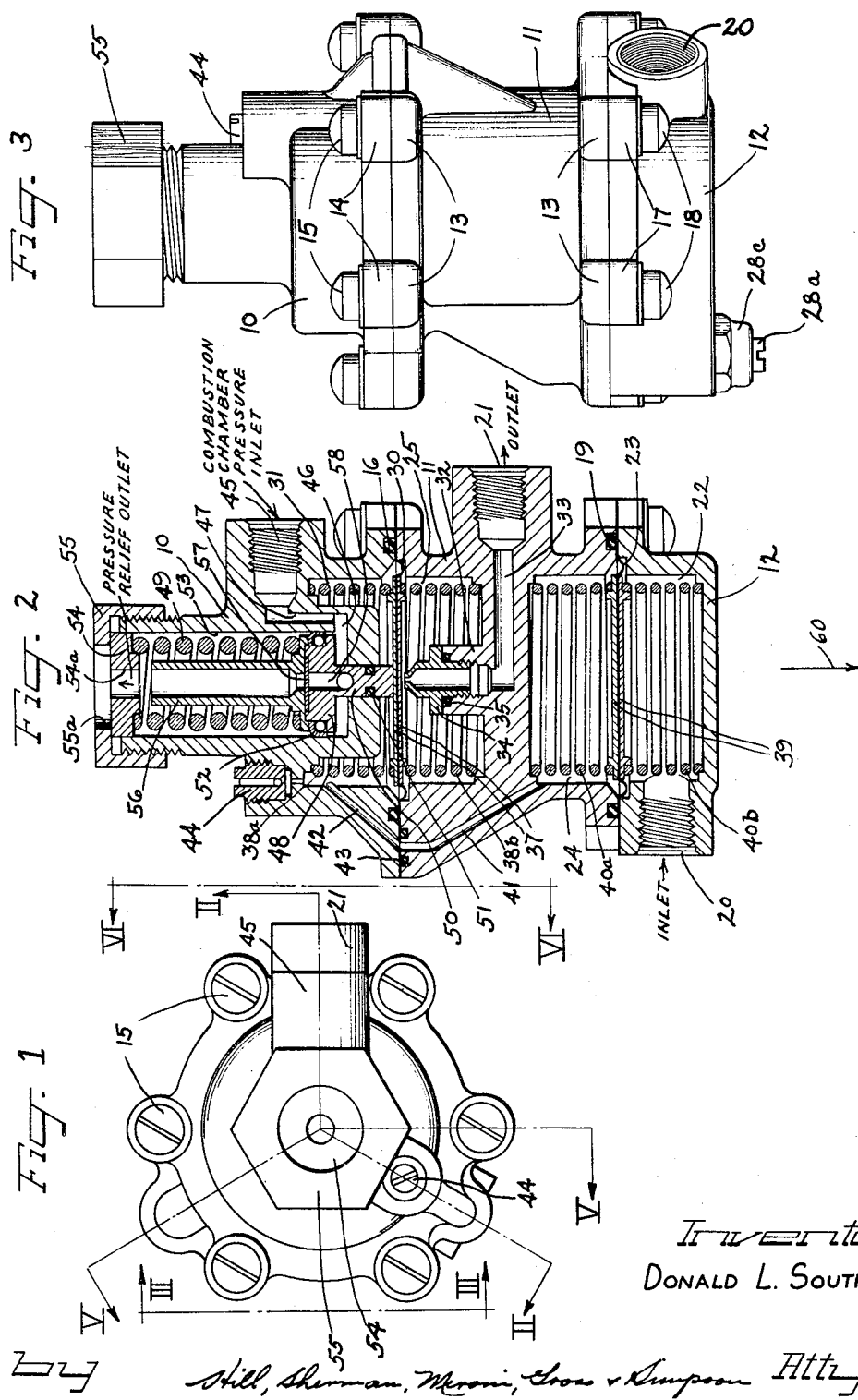
July 26, 1960 — D. L. SOUTHAM — 2,946,186
BALANCED REGULATOR VALVE
Filed Feb. 10, 1956 — 3 Sheets-Sheet 1
Inventor
Donald L. Southam July 26, 1960     D. L. SOUTHAM     2,946,186
BALANCED REGULATOR VALVE
Filed Feb. 10, 1956                           3 Sheets-Sheet 2
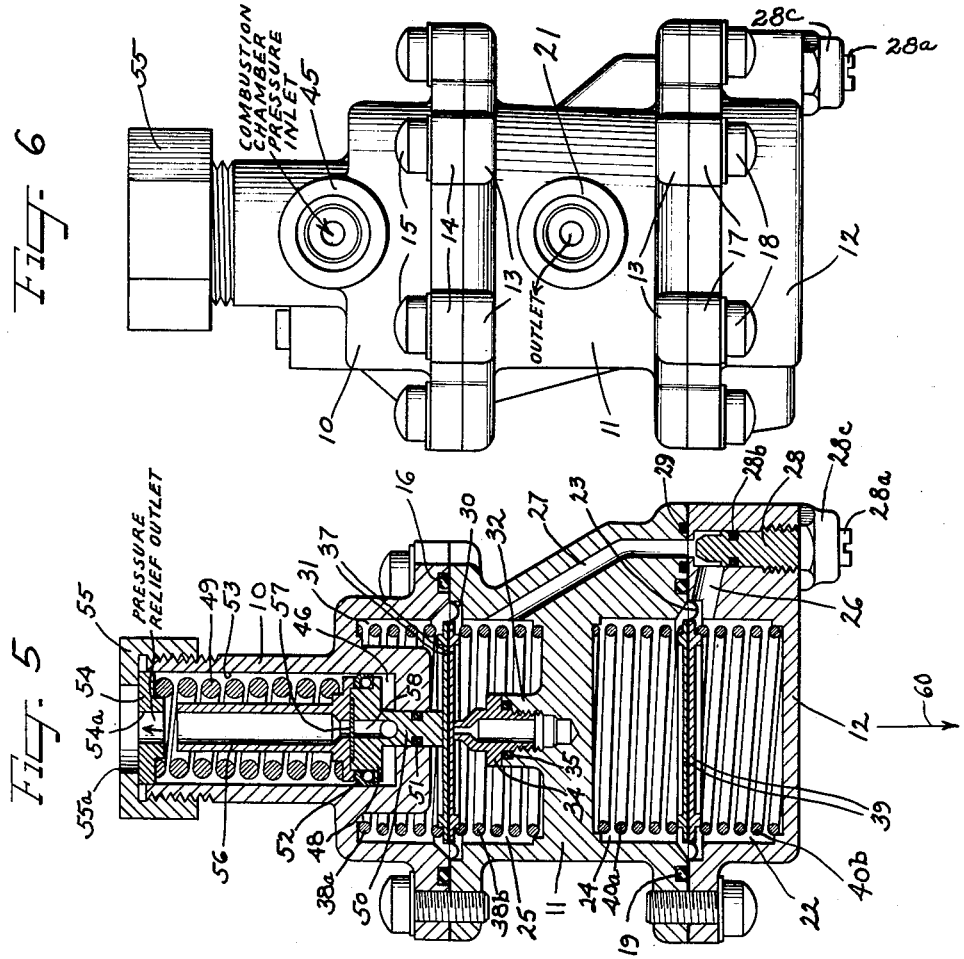
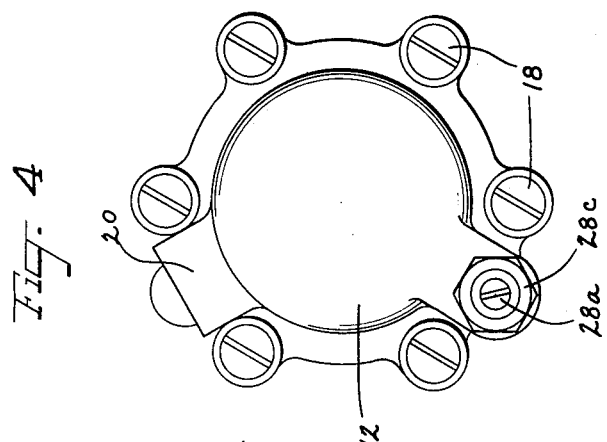
Inventor
Donald L. Southam

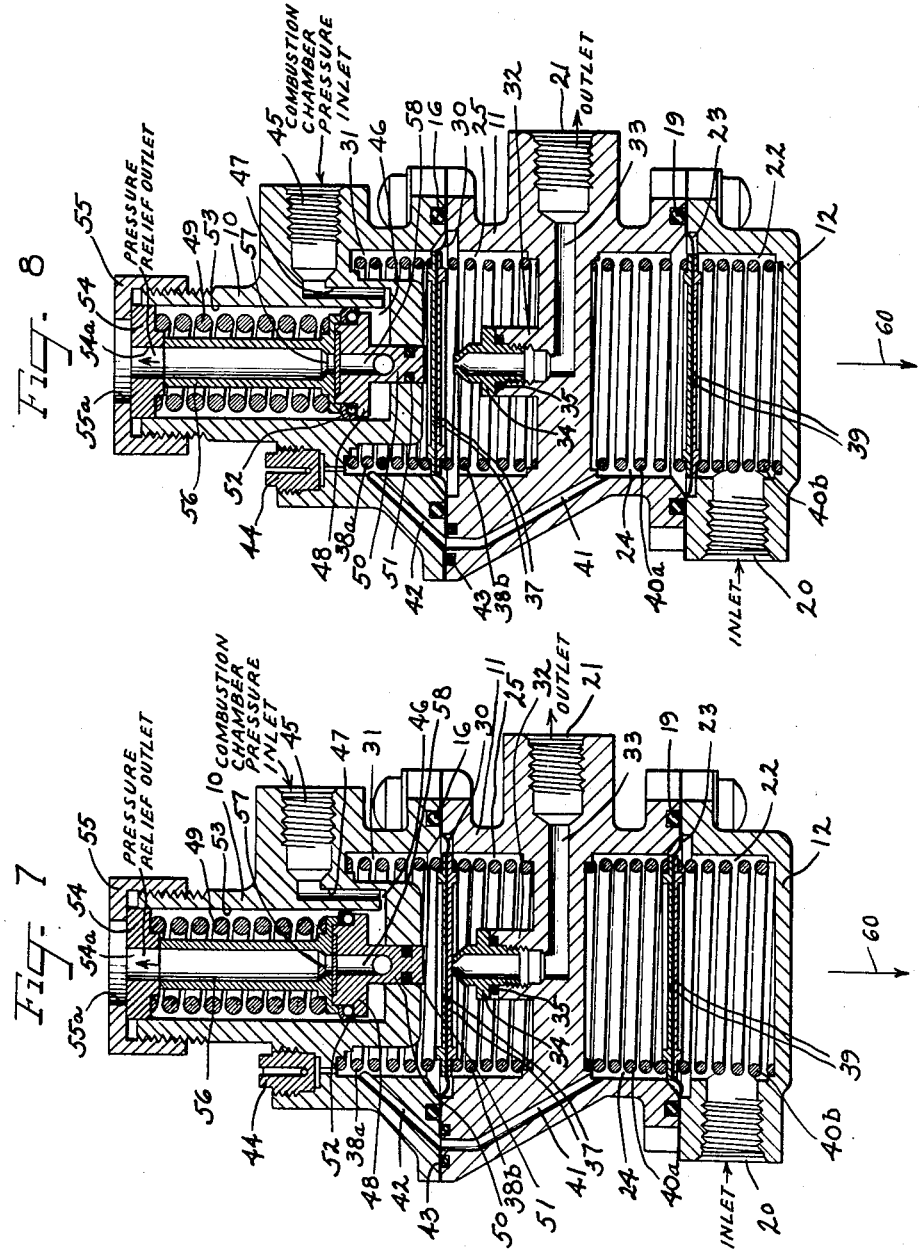

2,946,186

BALANCED REGULATOR VALVE

Donald L. Southam, Cleveland Heights, Ohio, assignor to Thompson Ramo Wooldridge Inc., a corporation of Ohio Filed Feb. 10, 1956, Ser. No. 564,661

8 Claims. (Cl. 60—39.09)

This invention relates in general to flow control apparatus and the like, and more particularly to balanced regulator valves or the like. The present invention is particularly useful in systems which require a carefully controlled fluid flow from a source having a widely variable pressure, such as a rocket fuel system wherein the fuel supply is originally under extremely high pressure and the pressure diminishes to a low value as the fuel is consumed, although other uses and purposes may be apparent to one skilled in the art.

The present invention deals with a compact regulator valve having a housing with an inlet and an outlet. A pair of in-line cavities are carried in the housing, each of which are divided by a diaphragm to define first and second chambers in each cavity. One of the chambers of one cavity is intercommunicated with the inlet, while one of the chambers of the other cavity is in communication with the outlet. These chambers are, in turn, interconnected by a passageway in which is located a needle valve. An orificed means is provided in the chamber communicating with the outlet to coact with the diaphragm in regulating the fluid flow therethrough. A second passageway is provided in the casing that interconnects the other chambers which are filled with a hydraulic fluid. These chambers function to transmit the fluid pressure in the cavity associated with the inlet to the other cavity that is associated with the outlet, wherein the diaphragm coacting with the orificed means responds to this pressure in controlling the fluid flow. A spring biased plunger is associated with a piston for locking the one diaphragm against the orificed means. The piston is in communication with a connection to a combustion chamber or the like, wherein the response to a signal received unlocks the diaphragm with respect to the orificed means. Springs are provided in each cavity to act against opposite sides of the diaphragms and urge the diaphragm in communication with the outlet away from the coacting orificed means for regulating flow therethrough.

Accordingly, it is an object of this invention to provide a flow control apparatus that is capable of smoothly and effectively converting a high pressure fluid flow into a carefully regulated low pressure fluid flow.

Another object of this invention is to provide a regulator valve which effects a carefully controlled fluid flow from a source having a widely variable pressure, wherein the valve is relatively small and compact, and has a minimum of parts.

Still another object of this invention is in the provision of a balanced regulator valve for producing a carefully controlled fluid flow from a source having a widely variable pressure, wherein the valve has excellent dampening characteristics.

A further object of this invention is to provide a regulator valve having a pair of cavities each including a diaphragm, wherein split pressure drops are effected across the diaphragms thereby minimizing bulk in valve construction.

A still further object of this invention resides in the provision of a regulator valve, wherein the inlet pressure controls a diaphragm coacting with an orificed means for regulating the discharge of the valve.

A still further object of this invention resides in the provision of a regulator valve, wherein the inlet pressure controls a diaphragm coacting with an orificed means for regulating the discharge of the valve, and wherein means is provided to normally close the diaphragm against the orificed means which operates in response to a signal from the device receiving the fluid flow of the valve.

A further object of this invention is to provide a flow control valve which accurately controls the flow of fluid with widely variable inlet and discharge pressures.

Modern high speed aircraft and particularly guided missiles require system components which can function under extreme acceleration conditions commonly referred to as high "g" load conditions.

Therefore, another object of this invention is to provide a regulator which can accurately regulate fluid flow under high "g" load conditions.

Other objects, features, and advantages of the invention will be apparent from the following detailed description, taken in conjunction with the accompanying sheets of drawings, wherein like reference numerals refer to like parts, in which:

On the drawings:

Figure 1 is a top plan view of a flow control apparatus embodying the invention;

Figure 2 is a vertical sectional view, with some parts in elevation, taken substantially along the lines II—II in Figure 1;

Figure 3 is a side elevational view looking in the direction of the arrows of line III—III as seen in Figure 1;

Figure 4 is a bottom plan view of the valve shown in Figure 1;

Figure 5 is a vertical cross sectional view, partly in elevation, taken substantially along lines V—V in Figure 1;

Figure 6 is a vertical side elevational view taken along line VI—VI of Figure 1 and looking in the direction of the arrows;

Figure 7 is a cross sectional view similar to Figure 2, but illustrating the diaphragms in operating position when the inlet pressure to the valve is extremely high; and Figure 8 is a view similar to Figure 7 but illustrating the positions of the diaphragms where the inlet pressure has been substantially diminished.

As shown on the drawings:

Referring to the drawings, the regulator valve of the present invention is comprised generally of a sectional casing or housing including an upper section 10, an intermediate section 11 and a bottom section 12.

The intermediate casing section 11 is flanged at each end and provided with a plurality of tapped bosses 13. The upper or top casing section 10 is similarly flanged on its lower end and provided with a plurality of apertured bosses 14 which receive cap screws 15. The cap screws 15 are threadedly received in the tapped bosses 13 of the intermediate casing section 11 thereby securely uniting the two sections. As seen in Figures 2 and 5, a conventional O-ring gasket 16 is provided to assure sealing engagement between the sections 10 and 11.

The bottom casing section 12 is similarly flanged at one end as the casing section 10, and is provided also with a plurality of apertured bosses 17 which receive cap screws 18. Likewise, the cap screws 18 are threadedly received in the tapped bosses 13 of the intermediate section 11, wherein the sections 11 and 12 are securely united together. And to assure sealing engagement between the flanges of sections 11 and 12, a conventional O-ring gasket 19 is employed.

As already discussed, the regulator valve of the present invention is primarily useful in rocket fuel systems where it is required that a carefully controlled fuel flow be obtained from a source having a widely variable pressure. Actually, the source of fuel supply is originally under extremely high pressure and the pressure diminishes to a low value as the fuel is consumed. The present regulator valve further serves to reduce the pressure of the fuel supply before delivering it to the combustion chamber of a rocket engine or the like.

The valve casing is provided with an inlet 20 in the form of a tapped opening which is adapted to be connected to a source of supply, such as a fuel supply. An outlet 21 is provided in the casing which also includes a tapped opening for connection to conduit or other suitable means and the combustion chamber of a rocket engine or the like or for some other device that may need a controlled fluid flow.

Referring particularly to Figures 2 and 5, the high pressure fluid, upon being delivered to the inlet 20, enters a lower chamber 22 of a lower cavity formed in casing sections 11 and 12 of the valve. This lower cavity is divided by a diaphragm 23 to define the lower chamber 22 and an upper chamber 24 which are not connected. The diaphragm 23 is of a conventional type and constructed of any suitable type of flexible material, such as rubber or the like, and has its peripheral edge clamped between the mating flanged faces of the housing sections 11 and 12.

From the chamber 22, the pressurized fluid is delivered to a second lower chamber 25 of an upper cavity in the valve casing through a passageway 26 and a passageway 27 (Fig. 5). Between the passageways 26 and 27 is disposed a metering orifice or needle valve 28. The needle valve 28 is of a conventional type and is provided at the inner end with a beveled edge which coacts with the entrance to the passageway 27 to control the fluid flow to the chamber 25. A slotted head 28a is provided on the needle valve which is threadedly received in the lower casing section 12 to thereby provide adjustable positioning with respect to the entrance of the passageway 27. It may be noted that an O-ring gasket 28b is carried on the shank of the needle valve to prevent any fluid leakage therealong. Further, it is seen that an O-ring gasket 29 is carried around the passageway 27 to prevent leakage along the mating surfaces of the casing sections 11 and 12.

It is seen that the upper and lower cavities in the valve casing are in line thereby enabling the construction of the valve to be extremely compact. The upper cavity is formed in the adjoining casing sections 10 and 11, and is divided by a flexible diaphragm 30 to define the lower chamber 25 and an upper chamber 31.

Substantially centrally disposed and upstanding from the bottom of the lower chamber 25 in the upper cavity is a center tapped bore 32 which communicates with the outlet 21 through a passageway 33 (Fig. 2). Threadedly received in this tapped bore is an orificed member 34 that is sealingly associated therewith by a conventional O-ring gasket 35. The inlet to the orificed member 34 constitutes a necked down portion with a horizontal surface that is adapted to coact with the diaphragm 30 in regulating the fluid flow through the regulator valve. In other words, the orificed member is stationary and the diaphragm 30 is movable away from and towards the orificed member inlet to control the fluid flow through the valve. Inasmuch as the orificed member 34 is removable, it is to be understood that a replacement of this orificed member or a substitution of a member having a different sized necked down portion to vary the operating characteristics of the valve may be provided. To more accurately control the fluid flow through the orificed member 34 by the coaction of the diaphragm 30 and the member, a pair of rigid stiffening members or plates of disk shape and indicated by the numeral 37 are secured to opposite sides of the diaphragm 30. These plates may be made of any rigid material, but preferably of metal, and the lower plate functions to coact with the necked down opening of the orificed member in opening and closing same to regulate the fuel flow therethrough upon movement of the diaphragm 30.

Due to the throttling of the fluid as it flows through the regulator valve and past the needle valve 28 and through the orificed member 34, the diaphragms 23 and 30 may have a tendency to vibrate or oscillate which would naturally cause irregular fluid flow through the valve. The hydraulic fluid which communicates with both diaphragms acts as a damping fluid and thereby reduces the diaphragm vibration and oscillation tendencies. Regulating springs are provided in each chamber to act on opposite sides of the diaphragms. With respect to the diaphragm 30, it may be noted that the stiffening members 37 are provided with an upstanding annular ridge near the outer periphery which functions to provide a seat for bottoming springs 38a and 38b on one end, the other end of the springs being bottomed on the respective casing sections.

A pair of stiffening members 39 are provided for the diaphragm 23 that are similar, if not identical to the stiffening members 37 for the diaphragm 30. These stiffening members are likewise secured to opposite sides of the diaphragm 23 and provided with upstanding annular ridges or rims for defining seats to bottom springs 40a and 40b associated with this diaphragm. The dampening springs are of course bottomed at their other ends on the respective casing sections.

The position of the diaphragm 30 with respect to the orificed member 34 is primarily determined by the pressure of the inlet fluid which enters the lower chamber 22 of the lower cavity. This pressure is transmitted to the diaphragm 23, the latter transmitting the force to the upper face of the diaphragm 30 through a fluid medium. As seen more clearly in Figure 2, the upper chamber 24 of the lower cavity and the upper chamber 31 of the upper cavity are communicable through a passageway 41 in the intermediate casing section 11 and a passageway 42 in the upper casing section 10 that are in registry with one another at their meeting ends. To prevent leakage of fluid between the registering ends of the passageway 41 and 42, a conventional O-ring gasket 43 is provided at the mating surfaces of the casing sections. Any suitable hydraulic fluid may be used as a fluid medium in filling these two chambers as long as the fluid is of the low thermal expansion type that will not boil or freeze within a predetermined temperature range. Preferably, a silicone oil may be employed. After the casing sections and the component parts of the valve have been assembled, the chambers 24 and 31 may be filled with the desired hydraulic fluid through a filler plug 44 in the upper casing section 10.

An additional control on the movement of diaphragm 30 in regulating the fluid flow through the orificed member 34 is provided which responds to a signal from a combustion chamber of the particular engine which this regulator valve is mounted. Referring particularly to Figure 2, that connection is had through a tapped opening 45 in the upper housing section 10 which leads to a work chamber 46 through a passageway 47. The signal, in the form of varying combustion chamber pressure acts against the annular face of a piston 48 that is normally biased towards the diaphragm 30 by a heavy coil spring 49. The piston is provided with a plunger or rod 50 which is slidably received within an aperture in the upper casing wall of the upper chamber 31 to terminate and bear against the upper stiffening member 37 of the diaphragm 30, and normally urge the lower stiffening member 37 into closed position with the necked down portion of the orificed member 34 and prevent fluid flow through the valve. A conventional O-ring gasket 51 encircles the rod 50 to coact with the bore in the casing wall and prevent leakage of fluid between the upper chamber 31 of the upper cavity and the work chamber 46.

The piston 48 is provided with a conventional packing cup and spreading member arrangement 52 which prevents leakage in the bore 53 in which the piston is slidably received. The upper end of the biasing spring 49 is bottomed on a retainer plate 54 that is slidably received within the bore 53 and adjustably positioned by a nut 55. The nut 55 is of course threadedly received on the outside of the upper casing member 10. To prevent the piston 48 from solidifying the spring 49, a tubular extension 56 extending upwardly from the piston 48 is adapted to engage the retaining plate 54 upon a predetermined movement.

Wherein the pressure in the work chamber 46 might become excessive and cause damage to the piston locking rod 50 and its assemblage, a frangible disk 57 is exposed on one side to the pressure in the chamber 46 through a right angular passageway 58 that is formed in the piston 48 and the rod 50. The other side of the disk opens to the atmosphere through the tubular extension 56, a center bore 54a in the retainer plate 54, and an aperture 55a in the nut 55. Thus, excessive pressure in the chamber 46 may be relieved upon fracturing of the frangible disk 57 to prevent breakage of the associated parts and possible complete failure of the regulator valve.

In operation, fuel or fluid initially supplied to the regulator valve will be of an extremely high pressure, and as seen in Figure 7, the effect of this pressure on the lower diaphragm 23 will force the diaphragm toward the end of the upper chamber 24. This action will force the hydraulic fluid from the chamber 24 and into the upper chamber 31 of the upper cavity and exert a force against the upper side of the upper diaphragm 30. The diaphragm 30 will then in turn, coact with the necked down portion of the orificed member 34 in regulating a fluid flow to the outlet 21. Of course, it will be assumed that a signal has already been received from the combustion chamber of the engine in which the regulator valve is installed to release the locking rod 50 so that the diaphragm 30 may move according to the pressures developed in the lower chamber 22 and transmitted to the upper diaphragm 30. As the pressure in the fuel supply diminishes, the diaphragm 30 will reverse its position, as shown, in exaggerated form, in Figure 8 and increase the opening between the stiffening member 37 of the diaphragm 30 and the necked down portion of the orificed member 34 to accordingly regulate the fluid flow through the regulator valve.

The pressure drop across the diaphragms is determined solely by the unbalanced spring forces which tend to urge the diaphragm 30 away from the orifice in the discharge passage. The pressure drop across the needle valve is therefore a constant value which is such that the unbalanced spring force on the diaphragm is balanced by the pressure drop moving the diaphragm toward the orifice in the discharge passage to a position of equilibrium. With the constant pressure drop across the needle valve determined, by the spring forces, adjustment of the needle valve will alter the flow rate setting for the valve.

Operation of the regulator valve when subject to acceleration forces may be described as follows by referring to Figure 2. An acceleration of the regulator valve along the axis perpendicular to the plane of the diaphragms is assumed in the direction indicated by the arrow 60. The forces acting on the diaphragm 30 of the regulator valve may be given by the relation that the force equals the mass times the acceleration for the solid parts. The reaction inertia forces acting on the diaphragm 30 in the direction opposite that of the direction of the acceleration may be summed as those of the spring $38b$, the diaphragm assembly with supports 37, and ⅓ of the spring $38a$. The reaction inertia forces acting on the diaphragm 30 in the direction of the acceleration may be summed as those of the spring $40a$, the diaphragm assembly 23 with supports 39 and ⅓ of spring $40b$. Other forces acting on diaphragm 30 include the compression forces of the springs $40a$, $40b$, $38a$, and $38b$ as well as the hydraulic forces of the fluids in chambers 22, 24, 25 and 31, but these forces do not influence the pressure regulating ability of the valve under high "g" load conditions. It may now be shown that by equating the mass of springs $40a$ and $38b$ and also the mass of springs $40b$ and $38a$ that the force balance equation becomes: The acceleration force of the diaphragm assembly 23 with supports 39 must equal the acceleration force of the diaphragm assembly 30 with supports 37. The same force balance equation can be derived by assuming an acceleration in the opposite direction. Therefore by selective design of the mass of the diaphragm support assemblies and springs, the regulator valve assembly may be balanced for axial acceleration forces. Lateral acceleration forces of high magnitude do not appreciably influence the regulating ability of a valve of this type as long as the two diaphragm chambers are in axial alignment.

From the foregoing, it is seen that the instant invention provides a regulator valve for use in regulating fluid flow from sources having a widely variable pressure wherein the valve has a minimum of parts, is simply constructed, and embraces excellent dampening characteristics.

It will be understood that modifications and variations may be effected without departing from the scope of the novel concepts of the present invention, but it is understood that this application is to be limited only by the scope of the appended claims.

I claim as my invention:

1. A flow control apparatus adapted to provide a regulated fluid flow from a fluid source having a widely variable pressure which comprises a casing having an inlet and an outlet, a pair of superposed cavities in said casing, a diaphragm in each cavity dividing the same to define a pair of chambers, a passageway intercommunicating one chamber in one cavity and one chamber in the other cavity, said communicating chambers being filled with fluid, a passageway intercommunicating said other chambers, one of said other chambers communicating with said inlet and the other of said other chambers communicating with said outlet, and aperture means in said chamber communicating with said outlet coacting with said adjacent diaphragm to control fluid flow through said apparatus in response to the fluid pressure in said chamber communicating with said inlet, retractable means for additionally controlling the diaphragm coacting with said aperture means, said means being responsive to a signal received from a device receiving the fluid flow of said apparatus, and pressure relief means carried by said retractable means and subjected to pressures from the device receiving the fluid flow of said apparatus, said pressure relief means being operable to vent said last mentioned pressure to atmosphere whenever said pressure reaches a predetermined maximum.

2. A balanced regulator valve adapted to feed a controlled fluid flow to the combustion chamber of a rocket engine or the like from a fluid source having a widely variable pressure which comprises a casing having an inlet and an outlet and a connection to the combustion chamber, a first cavity in said casing having a diaphragm dividing the cavity into first and second superposed chambers, said first chamber intercommunicating with said inlet, a second cavity in said casing in line with said first cavity and having a diaphragm dividing the same into first and second superposed chambers, said first chamber having an orificed means in communication with said outlet to coact with the diaphragm and regulate fluid flow, a metered passageway interconnecting said first chambers, a passageway connecting said second chambers, said second chambers being filled with hydraulic fluid to transmit the pressure in the first chamber of the first cavity to the diaphragm in the second cavity for controlling the fluid flow through the orificed means, and means associated with the connection to the combustion chamber for normally locking the diaphragm in the second cavity against the orificed means for preventing fluid flow, said latter means unlocking said last named diaphragm in response to a direct pressure signal from the combustion chamber.

3. A balanced regulator valve adapted to feed a controlled fluid flow to the combustion chamber of a rocket engine or the like from a fluid source having a widely variable pressure which comprises a casing having an inlet and an outlet and a connection to the combustion chamber, a first cavity in said casing having a diaphragm dividing the cavity into first and second superposed chambers, said first chamber intercommunicating with said inlet, a second cavity in said casing in line with said first cavity and having a diaphragm dividing the same into first and second superposed chambers, said first chamber having an orificed means in communication with said outlet to coact with the diaphragm and regulate fluid flow, a metered passageway interconnecting said first chambers, a passageway connecting said second chambers, said second chambers being filled with hydraulic fluid to transmit the pressure in the first chamber of the first cavity to the diaphragm in the second cavity for controlling the fluid flow through the orificed means, and means associated with the connection to the combustion chamber for normally locking the diaphragm in the second cavity against the orificed means for preventing fluid flow, said latter means unlocking said last named diaphragm in response to a direct pressure signal from the combustion chamber, said last named means including a spring biased piston acting against the diaphragm in the second cavity to urge same against the orificed means and a chamber enclosing said piston in communication with the combustion chamber connection.

4. A flow control apparatus adapted to provide a regulated fluid flow from a fluid source having a widely variable pressure which comprises a casing having a regulated fluid inlet and an outlet, said casing having a pair of cavities formed therein of substantially the same size and shape and in substantially the same attitude, a diaphragm in each cavity dividing the cavity into a pair of opposed chambers with the diaphragm providing a hydraulic transmitting fluid chamber and a regulated fluid chamber in each cavity, said hydraulic chambers being located at a corresponding end of each cavity, a passageway interconnecting the hydraulic fluid chamber in one cavity and the hydraulic fluid chamber in the other cavity, said hydraulic fluid chambers and passageway being filled with a hydraulic fluid, one of said regulated fluid chambers communicating with said inlet and the other of said regulated fluid chambers communicating with said outlet, a restricted passageway means between said inlet and said chamber communicating with the outlet, and a variable flow control valve means connected to said other chamber and to said outlet and forming said communication between said chamber communicating with the outlet and to said outlet, said valve connected to said diaphragm exposed to said chamber communicating with the outlet to be operated thereby to vary the valve opening to control fluid flow through said apparatus in response to the fluid pressure in said chamber communicating with said inlet, whereby inertia forces and gravitational forces acting on hydraulic fluid in each of said hydraulic fluid chambers will cause the hydraulic fluid to exert forces acting in the same direction and in substantially the same amount on said diaphragms to prevent disturbing the operation of said flow control valve.

5. A flow control apparatus adapted to provide a regulated fluid flow from a fluid source having a widely variable pressure which comprises a casing means having an inlet and an outlet for regulated fluid flow, first and second cavities formed in said casing means, a flexible diaphragm extending across each cavity and sealed at the wall of the cavity and forming a force transmitting fluid chamber at the corresponding end of each cavity of substantially the same depth, and a regulated fluid chamber in the other end of each cavity with said regulated fluid chamber in the first cavity communicating with said inlet and in said second cavity with said outlet, a passageway for force transmitting fluid connected to join the force transmitting fluid chambers for the flow of fluid therebetween, a restricted passageway between said inlet and said regulated fluid chamber in said second cavity, and a variable flow regulating valve between said flow regulating fluid chamber in said second cavity and said outlet and connected to be varied by the position of the diaphragm in said second cavity, whereby gravitational and inertia forces acting on force transmitting fluid placed in said force transmitting fluid chambers will act in opposition and with substantially equal force on said diaphragms and will not disturb flow control.

6. A flow control apparatus adapted to provide a regulated fluid flow from a fluid source having a widely variable pressure which comprises a casing means having an inlet and an outlet for regulated fluid flow, first and second cavities formed in said casing means, a flexible diaphragm extending across each cavity and sealed at the wall of the cavity and forming a force transmitting fluid chamber at the corresponding end of each cavity and a regulated fluid chamber in the other end of each cavity with said regulated fluid chamber in the first cavity communicating with said inlet and in said second cavity with said outlet, a passageway for force transmitting fluid connected to join the force transmitting fluid chambers for the flow of fluid therebetween, a restricted passageway between said inlet and said regulated fluid chamber in said second cavity, a variable flow regulating valve between said flow regulating fluid chamber in said cavity and said outlet, and regulating springs in each of said chambers positioned to act with opposite forces on opposite sides of the diaphragm, the mass of said springs on corresponding sides of each of said diaphragms having substantially the same characteristics with respect to acceleration forces whereby such forces will cause an equal force on each of the diaphragms and will not disturb flow control.

7. A flow control apparatus adapted to provide a regulated fluid flow from a fluid source having a widely variable pressure which comprises a casing means having an inlet and an outlet for regulated fluid flow, first and second cavities formed in said casing means, a flexible diaphragm extending across each cavity and sealed at the wall of the cavity and forming a force transmitting fluid chamber at the corresponding end of each cavity and a regulated fluid chamber in the other end of each cavity with said regulated fluid chamber in the first cavity communicating with said inlet and in said second cavity with said outlet, a passageway for force transmitting fluid connected to join the force transmitting fluid chambers for the flow of fluid therebetween, a restricted passageway between said inlet and said regulated fluid chamber in said second cavity, a member having a variable flow orifice secured in the regulated fluid chamber of said first cavity and facing the diaphragm whereby movement of the diaphragm will vary the effective flow opening of said orifice, and regulating springs in each of said chambers positioned to act with opposite force on opposite sides of the diaphragm, the mass of the diaphragms and the mass of said springs on corresponding sides of each of said diaphragms having substantially the same characteristic with respect to acceleration forces whereby such forces will cause an equal force on each of the diaphragms and will not disturb flow control.

8. A flow control apparatus adapted to provide a regulated fluid flow from a fluid source having a widely variable pressure which comprises a casing means having an inlet and an outlet for regulated fluid flow, first and second cavities formed in said casing means, a flexible diaphragm extending across each cavity and sealed at the wall of the cavity and forming a force transmitting fluid chamber at the corresponding end of each cavity and a regulated fluid chamber in the other end of each cavity with said regulated fluid chamber in the first cavity communicating with said inlet and in said second cavity with said outlet, a passageway for force transmitting fluid connected to join the force transmitting chambers for the flow of fluid therebetween, a restricted passageway between said inlet and said regulated fluid chamber in said second cavity, means for adjustably varying the amount of restriction of said restricted passageway, a member having a variable flow orifice secured in the regulated fluid chamber of said first cavity and facing the diaphragm whereby movement of the diaphragm will vary the effective flow opening of said orifice, regulating springs in each of said chambers positioned to act with opposite force on opposite sides of the diaphragms, the mass of the diaphragm and the mass of said springs on corresponding sides of each of said diaphragms having substantially the same characteristic with respect to acceleration forces whereby such forces will cause an equal force on each of the diaphragms and will not disturb flow control.

References Cited in the file of this patent

UNITED STATES PATENTS

| | | |
|---|---|---|
| 1,538,427 | Earl | May 19, 1925 |
| 2,026,704 | Petroe | Jan. 7, 1936 |
| 2,398,201 | Young et al. | Apr. 9, 1946 |
| 2,470,564 | Lawrence, Jr. et al. | May 17, 1949 |
| 2,505,798 | Skinner | May 2, 1950 |
| 2,545,703 | Orr | Mar. 20, 1951 |
| 2,708,342 | Allen et al. | May 17, 1955 |
| 2,743,577 | Malick | May 1, 1956 |
| 2,763,126 | Halford et al. | Sept. 18, 1956 |

FOREIGN PATENTS

| | | |
|---|---|---|
| 746,386 | Germany | July 29, 1944 |